United States Patent [19]

Fulkerson

[11] Patent Number: 4,722,325

[45] Date of Patent: Feb. 2, 1988

[54] SOLAR SHUTTER ARRANGEMENT

[76] Inventor: Paul L. Fulkerson, 2500 W. Roeder Rd., Boonville, Ind. 47601

[21] Appl. No.: 944,562

[22] Filed: Dec. 22, 1986

Related U.S. Application Data

[63] Continuation-in-part of Ser. No. 744,775, Jun. 14, 1985, abandoned.

[51] Int. Cl.⁴ .............................................. F24J 3/02
[52] U.S. Cl. ..................................... 126/419; 160/332; 47/17
[58] Field of Search ............... 126/418, 429, 431, 419, 126/437, 428; 47/17; 160/331, 332

[56] References Cited

U.S. PATENT DOCUMENTS

| | | | |
|---|---|---|---|
| 2,595,905 | 5/1952 | Tilkes | 126/419 |
| 3,822,692 | 7/1974 | Demarest | 126/DIG. 1 X |
| 4,020,826 | 5/1977 | Mole | 126/449 X |
| 4,279,240 | 7/1981 | Artusy | 126/419 |
| 4,296,733 | 10/1981 | Saunders | 126/419 X |
| 4,365,615 | 12/1982 | Melvin | 126/437 X |
| 4,387,533 | 6/1983 | Green et al. | 47/17 |
| 4,446,850 | 5/1984 | Zilisch | 126/431 |
| 4,452,228 | 6/1984 | Meyer | 126/437 X |
| 4,461,277 | 7/1984 | Pardo | 126/419 |
| 4,555,764 | 11/1985 | Kuehn | 126/419 |
| 4,565,186 | 1/1986 | Takata et al. | 126/428 |

FOREIGN PATENT DOCUMENTS

| | | | |
|---|---|---|---|
| 2507753 | 12/1982 | France | 126/418 |
| 2006420 | 5/1979 | United Kingdom | 126/419 |

Primary Examiner—Larry Jones
Attorney, Agent, or Firm—Warren D. Flackbert

[57] ABSTRACT

A shutter arrangement adaptable to a solar energy system for either a residential or commerical building characterized by a skylight presented in a roof portion of the building, and a shutter supported on the roof portion and selectively slidable behind the skylight from and to a solar energy blocking relationship with respect to the interior of the building in response to temperature variations. The shutter surface facing the skylight presents reflective physical properties, while the surface facing the interior of the bulding presents an ornamental appearance. The invention affords two-fold primary purposes, to-wit, high efficiency for a solar energy passive building and a decorative effect for the building's occupant. Importance lies in the fact that the temperature responsive device or thermocouple serving shutter control is in direct engagement with the inner surface of the glass panel forming part of the skylight.

4 Claims, 9 Drawing Figures

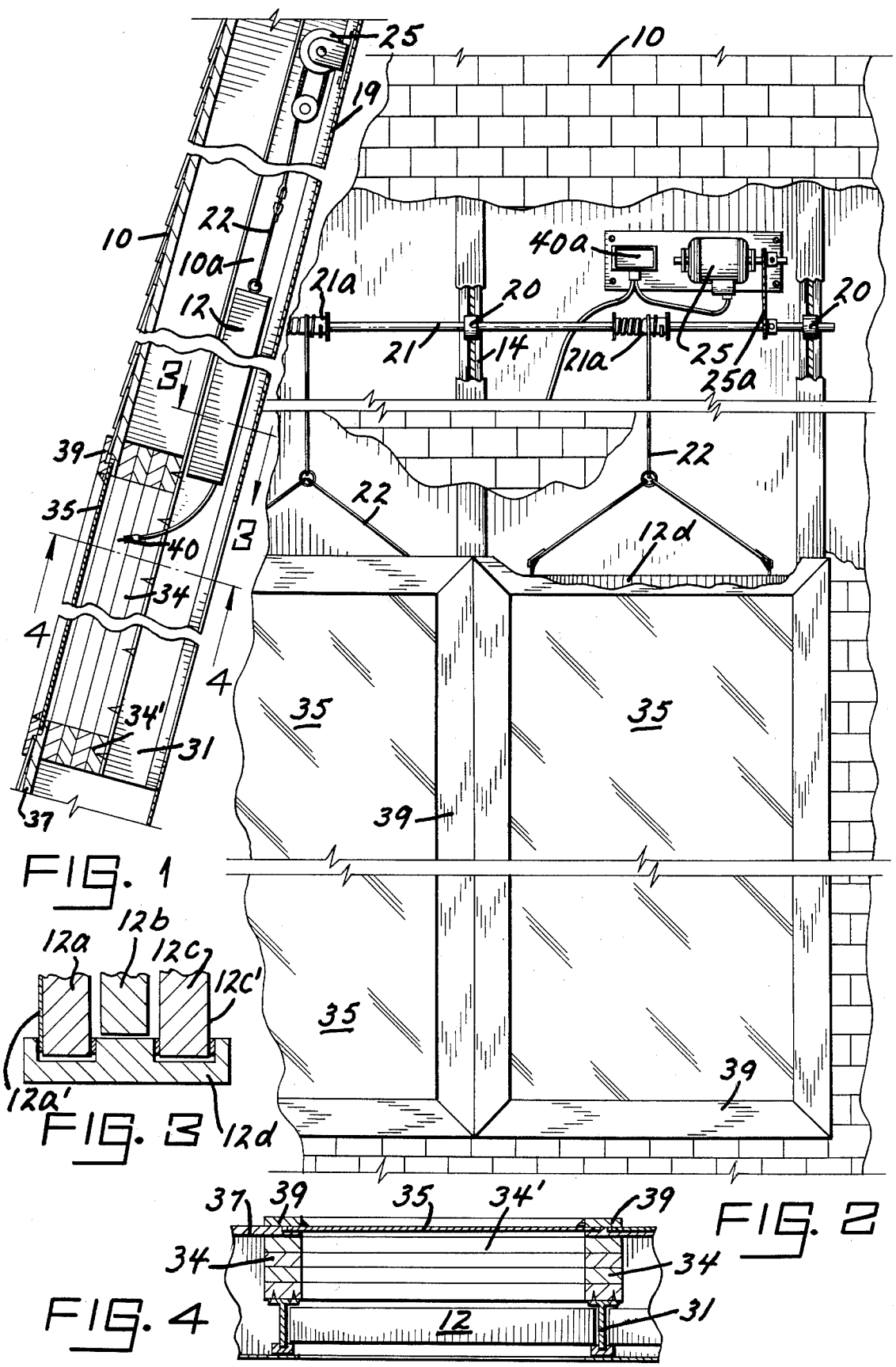

SOLAR SHUTTER ARRANGEMENT

The present application is a continuation-in-part application of Ser. No. 744,775, filed June 14, 1985, with the same title and inventor, now abandoned.

As is known, the employment of solar energy in connection with heating and/or cooling functions, as for residential structures, for example, is increasingly popular, representing savings not only of conventionally used energy resources but, additionally, in actual expense incurred by the individual consumer. In this regard, while many alternative solar energy systems are presently available, the present invention is directed to a particular feature having general utility and/or adaptability to virtually any of such.

More specifically, the invention at hand presents a solar shutter arrangement represented by one or more solid and framed shutters, preferably one-piece panels, the outer surface(s) of which present reflective physical properties, each being selectively movable from one position to another depending upon a use mode requirement, as, for example, a heating or a cooling function. The instant solar shutter arrangement is typically installed in a skylight built into the roof of the residential structure. The individual shutters defining the arrangement are operable by a motor driven reel, the latter receiving cables which support the shutters and afford ready movement thereof to and from any desired use location responsive to temperature variations or the user's needs.

The solar shutter arrangement of the invention affords high efficiency for any given solar type heating-cooling system and, at the same time, affords a decorative appearance pleasing to the owner/user, i.e. presents a mural or other type of decorative effect on the inner surface of each shutter. Thus, at least a two-fold end result is achieved, to-wit, and as stated, efficiency in function and a decorative installation.

In any event, a better understanding of the present invention will become more apparent from the following description, taken in conjunction with the accompanying drawing, wherein FIG. 1 is a view in side elevation, partly in section, showing a solar shutter arrangement in accordance with the teachings of the present invention;

FIG. 2 is a front plan view, partly fragmentary, of a typical solar shutter installation;

FIG. 3 is a view in section, taken generally at line 3—3 on FIG. 1 and looking in the direction of the arrows, illustrating the frame and panel assembly defining a shutter in one invention form;

FIG. 4 is another view in section, in this instance taken at line 4—4 on FIG. 1 and looking in the direction of the arrows, further detailing a typical solar shutter installation;

Figure 5:
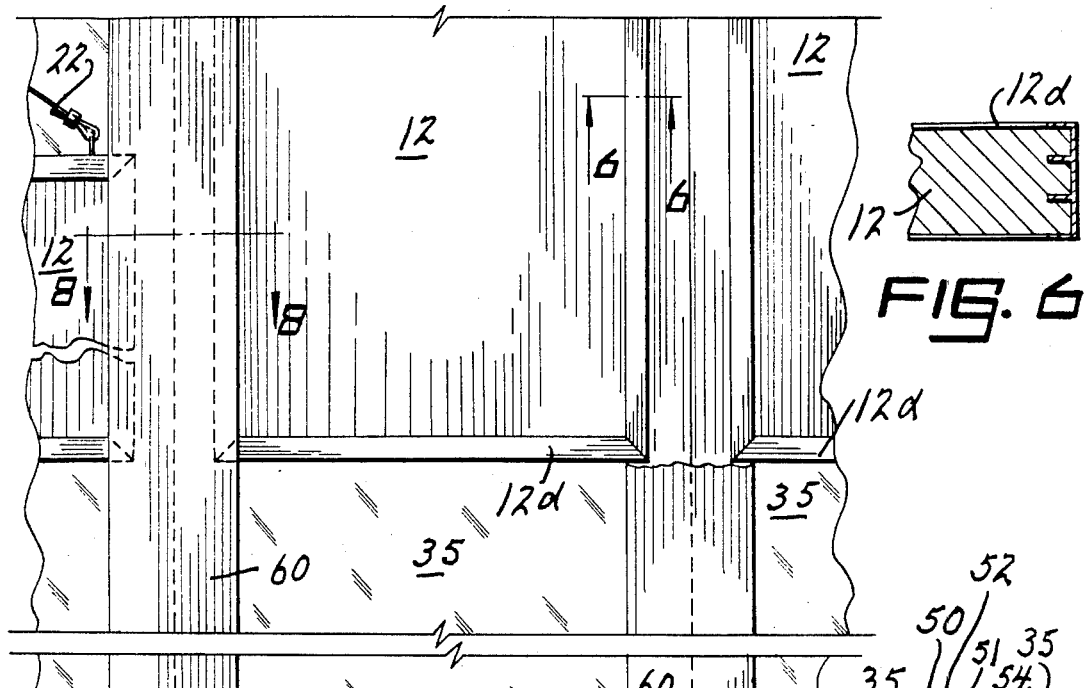
FIG. 5 is another front plan view, of an alternative invention form, generally comparing to FIG. 2, but with the shutters at a partially lowered position.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modification in the illustrated devices, and such further applications of the principles of the invention as illustrated therein being contemplated as would normally occur to one skilled in the art to which the invention relates.

Referring now to the figures, the solar shutter arrangement of the invention is shown in a typical installation located on roof 10 of a building, where each shutter 12 is selectively concealed within a space 10a behind or beneath the roof 10 at one location and is movable to a position behind a window panel 35 presenting a skylight 30 (see FIGS. 1, 2 and 5).

Figure 6:
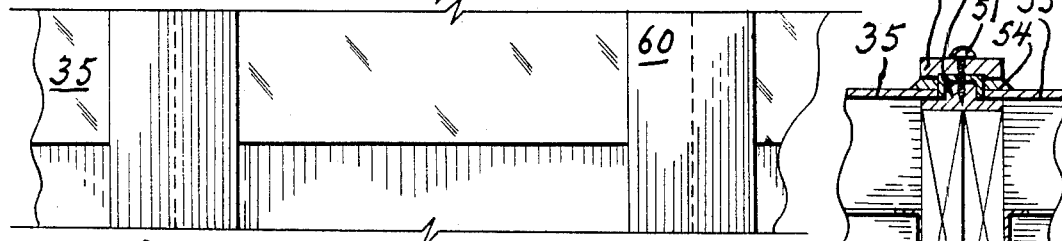
FIG. 6 is a fragmentary view of a preferred shutter form, detailing the frame arrangement, and taken at line 6—6 on FIG. 5 and looking in the direction of the arrows.

As evident in FIG. 3, each shutter 12 may be defined by assembled insulative panels 12a, 12b and 12c, typically made from a styrofoam material, where panel 12a includes a heat reflective outwardly facing layer 12a' and panel 12c includes a decorative surface 12c', as a mural section, directed towards the inside of the building. In a preferred form, however, and as evident in FIG. 6, the shutter 12 is presented as a one-piece solid panel, also made from a styrofoam material.

In either instance, i.e. the one-piece panel (FIG. 6) or the assembled panels 12a, 12b and 12c (FIG. 3), a frame 12d, typically made from a high impact plastic resin, importantly surrounds such, serving ease and protection during movement and adding to shutter 12 life. An adhesive or like substance (not shown) achieves a positive and sealed assembly between the shutter 12 and the frame 12d.

Thus, each shutter 12 presents a framed appearance when viewed from either the front or rear thereof. Moreover, in any given installation, the number of solar shutters 12 employed may be varied, where two are representatively presented in FIG. 2 and three representatively presented in FIG. 5.

As further evident in FIG. 2, angling caps 14, beneath the roof 10 and concealed by ceiling 19, define the aforesaid space 10a within which each of the shutters 12 may be selectively positioned, i.e. move into and from. In this regard, bearings 20, secured to the caps 14, rotatably mount a shaft 21, the latter being driven bi-directionally from an electric power source, as motor 25, through, for example, a belt or chain 25a.

The shaft 21 mounts grooved reels 21a which serve to wind, or unwind, cables 22 which support each shutter 12. In other words, with the rotation of shaft 21, and the winding or unwinding of cables 22, each shutter 12 moves upwardly or downwardly (see FIGS. 1 and 5). All cables 22, i.e. for adjacent shutters 12, move simultaneously, and, therefore, provide total selective sun/heat blocking and/or unblocking action, to be described herebelow.

As to the arrangement of FIGS. 1 and 4, skylight 30, presented in roof 10, is defined by I-beam 31 supported laminated wooden members 34, together with cooperative laterally extending wooden members 34'. The (tempered) glass panel 35 is supported on decking 37 mounted on the wooden members 34—34', where a frame member 39 surrounds and overlies the glass panel 35 (again see FIG. 2).

Figure 7:
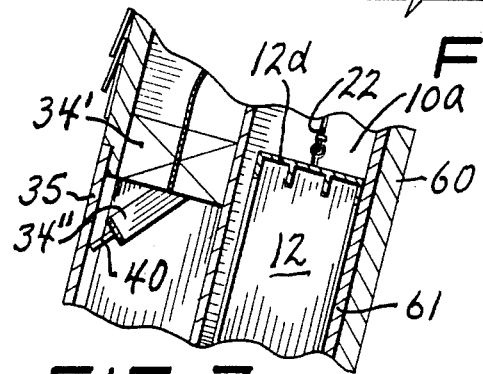
FIG. 7 is a fragmentary view in side elevation, detailing the location of the thermocouple in the space between the glass panel of the skylight and a shutter.

With reference now to FIG. 7, and importantly, a thermocouple or temperature responsive device 40, typically black in color for optimum solar radiation absorption, i.e. because of more sensitivity to sunlight, is secured to a support 34" depending from wooden member 34' forming part of skylight 30. The thermocouple 40 is in direct engagement with the inner surface of the glass panel 35 (0.5R) and, typically, proximate the top of the glass panel 35 at a location avoiding any shade that a structural member might produce. The location of the thermocouple 40 against the glass panel 35 achieves optimum sensitivity in the absence of sunlight, resulting in faster response of the motor 25 which controls the linear movement of the shutters 12.

Figure 8:
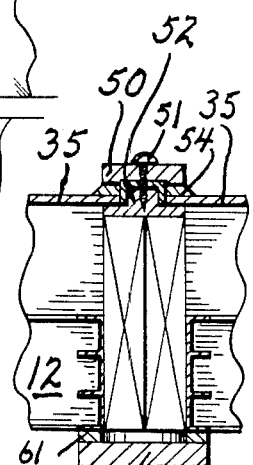
FIG. 8 is another view in cross-section, taken at line 8—8 on FIG. 5 and looking in the direction of the arrows, but, in this instance, detailing a preferred shutter installation assembly; and, FIG. 9 is a schematic diagram of the control circuitry for a typical installation.

FIG. 8, together with FIG. 5, shows a preferred alternative shutter 12 installation which includes a cap 50 overlying the glass panels 35, being positioned by an assembly defined by a threaded member 51, such as a screw, and a shim 52. Silicon or like material 54 is typically disposed between the cap 50 and the glass panels 35 for sealing purposes. The installation further includes, towards the inside of the building, a track 60, where a layer of cloth 61, for example, is applied thereto for smoother shutter 12 sliding action and, as well, for noise control (also see FIG. 7).

In other words, the arrangement is such that the glass panel 35 permits sun to pass into the interior of the building, depending upon the position of the shutter(s) 12 which selectively travel(s) to and from space 10a. The movement, or opening and closing, of each of the shutters 12 is responsive to the temperature of the thermocouple 40, the latter serving to control operation of the power source 25 through a conventional shutter controller 40a.

In this connection, and as a matter of example, during operation in a winter mode, sunlight entering skylight 30 strikes thermocouple 40, increasing the heat on the latter to an upper limit, as, for example, 110° F., and sending a signal to power source 25 through the conventional shutter controller 40a. At such time, shaft 21 rotates the proper amount of turns to wind the cables 22 on the grooved reels 21a, pulling shutters 12 into space 10a. Without the shutters 12 obstructing passage, sunlight fully enters into the building, where, typically, such is aimed at passive stone and/or masonry.

In the instance where the sun sets or is concealed behind a cloud for an extended period of time, thermocouple 40 cools to a lower limit, as, for example, 90° F., again sending a signal to the power source 25 to rotate the shaft 21 oppositely and move the shutters 12 into a closed position with respect to skylight 30. Thus, much of the gained heat is retained.

In the summer mode of operation, generally a reversed operation (to the above) is achieved, i.e. thermocouple 40 heats to a high limit, where all shutters 12 will be closed, reflecting any direct solar gain (by reason of the reflective layer 12a'). On the other hand, when the sun sets or is concealed behind a cloud for an extended time period, thermocouple 40 cools and the shutters 12 open, whereby the building can lose unwanted heat through skylight 30 by reason of the "night sky radiation" principle.

Figure 9:
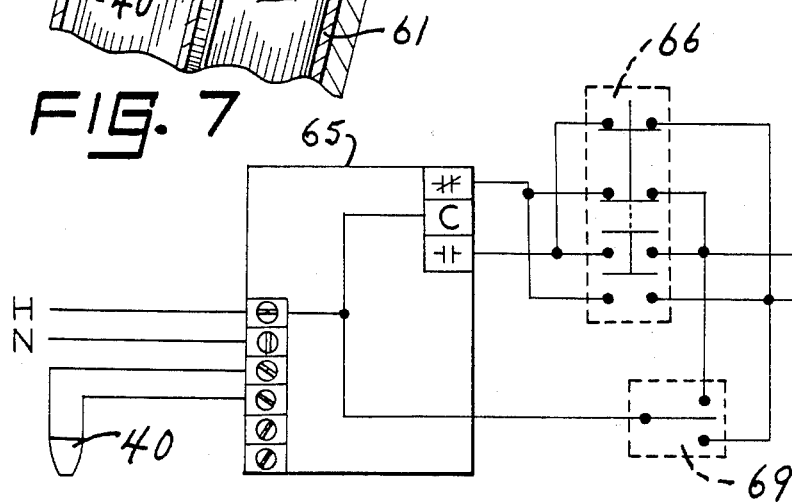

As to the circuitry for the solar shutter arrangement presented by the invention, and with reference to FIG. 9, such, typically, includes the aforesaid shutter controller 40a, which, as stated, responds to operational demands for physically making the shutters 12 open or close as the temperature increases or decreases. As shown, thermocouple 40 feeds into a control unit 65 which is normally closed, but which opens upon an increase in temperature. A double-throw double-pole mode control switch 66 serves to change the operational sequence from a winter to a summer mode, or conversely. Additionally, a spring-loaded single-pole double-throw switch 69 is an optional part of the circuitry, serving, if moved downwardly, to close the shutters 12 and, if moved upwardly, to open the shutters 12. As the figure indicates, switch 69 is normally at a neutral physical position.

Thus, it should be evident that the instant solar shutter arrangement serves to increase the efficiency of solar passive buildings where, by means of automatically operated shutters, sunlight and associated heat enters the building whenever available, and conversely. The shutters 12, in framed panel form, serve insulative purposes to selectively prevent heat loss or gain.

The invention serves to decrease the cost of operating a solar energy controlled building by affording more efficiency. Additionally, the shutters serve a decorative purpose in that the inwardly facing surfaces thereof may include a mural or any artistic effect. Moreover, while described herein in connection with a residential building, the invention has application to any sized structure, even those used for commercial purposes.

In any event, the solar shutter arrangement described above is susceptible to various changes within the spirit of the invention, including, for example, proportioning; the manner of raising and lowering each shutter; the particular assembly of a shutter; the shape and/or configuration of the skylight; and, the like. Thus, the preceding should be considered as illustrative and not as limiting the scope of the following claims:

I claim:

1. In a structure having a roof with a skylight including a glass panel which transmits solar energy, a shutter arrangement supported on said roof comprising an insulative flat one-piece solid shutter in the form of a panel selectively and linearly slidable on tracks which conceal the side edges thereof from a position blocking transmittal of solar energy through said glass panel of said skylight into an area within said structure to a position permitting transmittal of solar energy through said glass panel of said skylight into said area within said structure, where said skylight presents a space between said glass panel and said selectively and linearly slidable insulative flat one-piece solid shutter, where the latter serves as the selective inner wall of said space contiguous with said area within said structure and said glass panel serves as the fixed outer wall of said space, where temperature responsive means is disposed within said space and in direct engagement with the inner surface of said glass panel, where said temperature responsive means is a black thermocouple operating a motor in a driving relationship with said insulative flat one-piece solid shutter, where said insulative flat one-piece solid shutter is supported by a cable secured to a rotatable shaft controlled by said motor, where bi-directional movement of said rotatable shaft achieves raising and lowering of said insulative flat one-piece solid shutter to each of said solar energy blocking and transmittal positions, and where said insulative flat one-piece solid shutter includes a reflective surface facing said skylight and a decorative surface facing said area within said structure.

2. The shutter arrangement of claim 1 where temperature responsive electrical switching means control the position of said insulative flat one-piece solid shutter.

3. The shutter arrangement of claim 1 where said insulative flat one-piece solid shutter is framed by a high impact plastic material.

4. The shutter arrangement of claim 1 wherein a series of insulative flat one-piece solid shutters in a side-by-side relationship are disposed behind said skylight towards said area within said structure and are simultaneously slidable both selectively and linearly.

* * * * *